June 23, 1931.  H. R. BORMANN ET AL  1,810,900
WELDROD CHUCK FOR ELECTRIC ARC WELDING
Filed Sept. 3, 1929
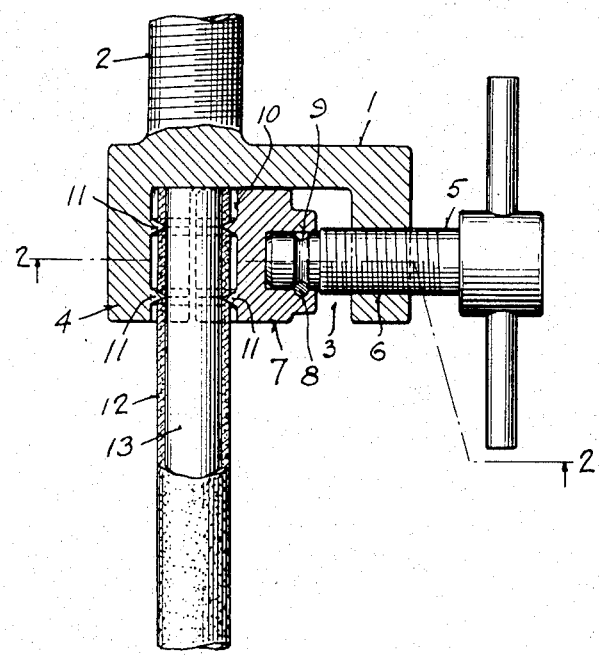
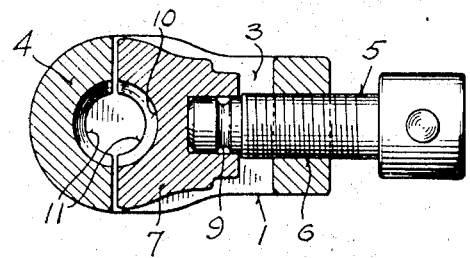
INVENTORS:
Henry R. Bormann
and Alfons Steinhart
BY
ATTORNEY.

Patented June 23, 1931

1,810,900

UNITED STATES PATENT OFFICE

HENRY R. BORMANN AND ALFONS STEINHART, OF MILWAUKEE, WISCONSIN, ASSIGNORS TO A. O. SMITH CORPORATION, OF MILWAUKEE, WISCONSIN, A CORPORATION OF NEW YORK

WELDROD CHUCK FOR ELECTRIC ARC WELDING

Application filed September 3, 1929. Serial No. 390,028.

This invention relates to a weldrod holder employed in electric arc welding and is particularly adapted for weldrods having a covering of substantial thickness thereon.

It has heretofore been the practice in applying coverings of substantial thickness on a weldrod by extrusion, dipping, or otherwise to cover the entire weldrod and thereafter remove a portion of the coating in order to effect an electrical contact between the holder and the metallic core of the weldrod.

One of the objects of the present invention is to provide a weldrod holder which makes the stripping of the covering for contact purposes unnecessary.

Another object of the invention is to provide a weldrod holder which will have a minimum resistance to the flow of the welding current from the holder to the weldrod.

A further object of the invention is to provide a holder which is adapted to contact with the weldrod substantially throughout the circumference thereof so that the current will be uniformly distributed to the weldrod throughout the circumference.

Having these and other objects in view, the invention is best illustrated by referring to the accompanying drawings in which:

Figure 1 illustrates a side view of the improved weldrod holder showing parts thereof in section.

Fig. 2 is a section taken on line 2—2 of Figure 1.

Referring to the drawings, the numeral 1 indicates a weldrod holder having a threaded extension 2 for connection with the welding head (not shown) whereby the weldrod may be fed toward the work at a rate in proportion to the consumption thereof.

The holder 1 is provided with a recess 3 having one side wall 4 arcuate to form one face of the weldrod clamping mechanism. The recess 3 is further provided with an adjustable clamping mechanism adapted to engage the opposite circumference of the weldrod to normally hold the same in place and permit the insertion and removal thereof.

The adjustable clamping mechanism comprises a thumb screw 5 adapted to engage a threaded opening 6 in the holder 1. The inner end of the screw 5 engages a recess in a clamping plate 7 and is rotatably secured thereto by means of a key 8 which engages a circumferential groove 9 in the thumb screw. The clamping plate 7 is held from rotation by engagement with the main body of the holder.

The clamping plate 7 has an arcuate surface 10 in complementary relation to the arcuate surface of the side wall 4 and forming therewith clamping surfaces for engaging the side of the weldrod. The clamping surfaces of the side wall 4 and the clamping plate 7 are provided with knife edge projections 11 which are adapted to penetrate through the covering 12 of the weldrod and contact with the metallic core 13. The projections may be of any suitable form such as circumferential beads, or, in lieu thereof, may be in the form of prongs.

As before stated, the projections 11 are adapted to penetrate the covering 12 of the weldrod when clamping pressure is applied through the thumb screw 5 and to thereby provide an efficient electrical contact between the holder and the entire periphery of the weldrod and to cause the current to be uniformly distributed throughout the periphery of the metallic core rather than to be localized at one side as is many times the case when a set screw is provided for holding the weldrod in the holder.

Having thus described the invention, it is understood that various modifications may be made within the scope of the accompanying claims.

What is desired to be protected by Letters Patent is:

1. A weldrod holder comprising a body portion having a recess therein, one side wall of the recess having arcuate cutting edges adapted to conform with a portion of the periphery of the weldrod, a slidably mounted clamping member disposed in said recess and provided with arcuate cutting edges in complementary relation to the arcuate cutting edges of said recess, and means for radially actuating said clamping member to permit the insertion and removal of the weldrod.

2. A weldrod holder having adjustable clamping members adapted to form a chuck for retaining one end of a covered weldrod during welding, pointed projections on the clamping surfaces of said members for cutting through the covering and firmly and rigidly engaging the weldrod core to provide an efficient electrical contact between the holder and the weldrod core, and screw means for forcing said clamping members into engagement with the weldrod core.

3. A holder for covered weldrods comprising cooperating, relatively movable clamping members, sharp projections on the clamping surfaces of said clamping members conforming to the contour of the metal core of the weldrod and adapted to penetrate the covering, and means for forcing said projections into electrical contact with said core.

4. A holder for weldrods having coverings of substantial thickness thereon, comprising a pair of clamping members, sharp arcuate projections on the clamping surfaces of said clamping members conforming to the contour of the weldrod core and adapted to pierce the covering and to electrically contact with said weldrod core, and means for moving said clamps into engagement with said weldrod core.

5. A chuck for holding covered weldrods comprising cooperating clamping members, penetrating cutting edges on the contacting surfaces of said clamping members conforming to the periphery of the metal core of said weldrods, and means for forcing said penetrating cutting edges into electrical contact with the core of said weldrod.

In witness whereof we have hereunto signed our names at Milwaukee, Wisconsin, this 6th day of August, 1929.

HENRY R. BORMANN.
ALFONS STEINHART.